(12) United States Patent
Yamanaka

(10) Patent No.: US 6,414,804 B1
(45) Date of Patent: Jul. 2, 2002

(54) CONVERGING OPTICAL SYSTEM FOR LASER BEAM SOURCE

(75) Inventor: Yutaka Yamanaka, Tokyo (JP)

(73) Assignee: NEC Corporation, Tokyo (JP)

( * ) Notice: Subject to any disclaimer, the term of this patent is extended or adjusted under 35 U.S.C. 154(b) by 48 days.

(21) Appl. No.: 09/641,763

(22) Filed: Aug. 21, 2000

(30) Foreign Application Priority Data

Aug. 19, 1999 (JP) ............................................. 11-232356

(51) Int. Cl.$^7$ ................................................ G02B 5/22

(52) U.S. Cl. ....................... 359/888; 359/885; 359/566; 372/108

(58) Field of Search ................................ 359/888, 885, 359/889; 372/108, 30, 31

(56) References Cited

U.S. PATENT DOCUMENTS

| | | | |
|---|---|---|---|
| 5,111,343 A | * 5/1992 | Harrigan | 359/888 |
| 6,008,941 A | * 12/1999 | Feldman | 359/565 |

FOREIGN PATENT DOCUMENTS

| | | | |
|---|---|---|---|
| JP | 4-20920 | | 1/1992 |
| JP | 04-020920 | * | 1/1992 |

* cited by examiner

Primary Examiner—Cassandra Spyrou
Assistant Examiner—Leo Boutsikaris
(74) Attorney, Agent, or Firm—McGinn & Gibb, PLLC

(57) ABSTRACT

A beam intensity filter 2 with increasing permeability with increasing distance from the optical axis in the U axis direction is disposed between laser beam source 1 and objective lens 3 such that the U axis direction is coincident with small beam emission angle direction, in which the laser beam is emitted from the laser beam source 1. The output beam from the beam intensity filter 2 transmitting the laser beam is such that the beam intensity difference between the neighborhood of the optical axis and locations distant therefrom in opposite directions is reduced. An enlarged beam emission angle distribution is thus obtained, and it is possible to provide a beam intensity distribution close to the case of beam emission angles from the V axis direction perpendicular to the U axis direction. Thus, the beam intensity distributions in the two perpendicular directions in the lens aperture of the objective lens 3 are substantially equal, and permit ready formation of a very small spot close to a circular spot without changing the distance between or disposition of the objective lens 3 and the laser beam source 1 but by correcting the beam emission angle asymmetricity of the semiconductor laser.

10 Claims, 9 Drawing Sheets

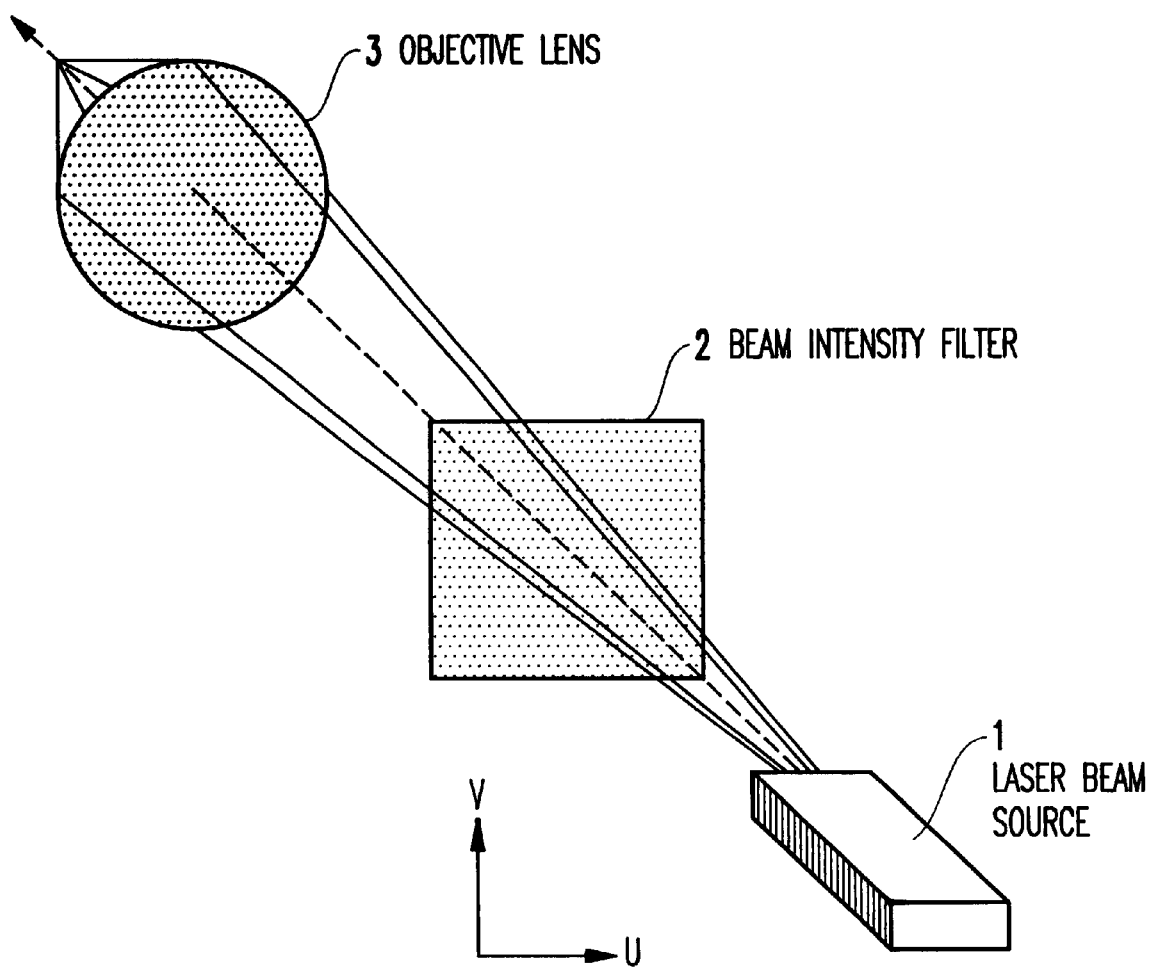

CONVERGING OPTICAL SYSTEM FOR LASER BEAM SOURCE

BACKGROUND OF THE INVENTION

The present invention relates to converging optical systems for a laser beam source, such as an optical system for an optical head for forming a very small beam spot by converging a laser beam emitted from a semiconductor laser with a lens system.

It is well known in the art that the beam intensity distribution of a laser beam emitted from a semiconductor layer, is approximated by the Gauss distribution and also that, by converging such a semiconductor laser beam to a very small beam spot with an objective lens having a substantially circular lens aperture, the converged beam spot varies in diameter in dependence on the beam intensity distribution in the lens aperture. More specifically, the smaller spot diameter is obtainable the more uniform is the beam intensity distribution in the lens aperture, that is, the smaller the beam intensity difference between the center and the edge of the lens aperture. The semiconductor laser serves as laser beam source for providing a divergent beam output with the beam emission position as substantial point beam source, and it has a character that its beam emission angle is different in two directions perpendicular to the optical axis of the emitted laser beam. FIG. 2 shows beam intensity distributions plotted against the beam emission angle from two perpendicular directions, i.e., a U axis and a V axis direction. It will be seen that for the same beam intensity the beam emission angle from the U axis direction is smaller. The beam emission angle is often expressed in terms of angle corresponding to one half the maximum beam intensity on the optical axis. As shown by arrow mark in the Figure, the angle from the U axis direction is smaller.

Thus, it will be seen that by converging a laser beam with different beam emission angles in the two directions as shown in FIG. 2A as a very small spot in a circular objective lens aperture, a large diameter converged beam spot, i.e., an oval spot, is produced because of a large beam intensity distribution difference of the spot dimension in the U axis direction from the spot dimension in the V axis direction. This phenomenon is undesired when it is desired to utilize as circular converged beam spot as possible, for instance in the case of an optical head for an optical disc.

As a simple method to be used for avoiding the production of such an oval converged beam spot and obtaining as small spot diameter as possible, is one in which the lens aperture corresponding to the beam emission angle is reduced to obtain beam convergence of only the neighborhood of the beam intensity distribution center. This means that the distance between the lens and the laser beam source is increased when the lens aperture diameter is the same, that is, a long focal distance lens is used. This method, however, has a problem that the optical system is increased in size as a whole because the distance between the lens and the laser beam source is increased.

FIG. 10 shows a different prior art technique, in which the beam intensity distribution of a laser beam is enlarged in a particular direction. In this example, a laser beam emitted from a laser beam source 1 is collimated in a collimator lens to a parallel beam. A triangular shaping prism 8 enlarges the beam intensity distribution of the parallel beam in the U axis direction. An objective lens 3 converges the output beam from the prism 8. Since in this case the beam intensity distribution is enlarged only in the small beam emission angle direction, it is possible to obtain a very small beam spot without substantially deteriorating the beam utilization factor. This method, however, requires a separate component for shaping the beam and also place of disposition of the component. In addition, since the diffraction by the prism is utilized, a problem arises that a change in the wavelength of the emitted laser beam results in a change in the direction of the emitted laser beam.

SUMMARY OF THE INVENTION

An object of the present invention is to provide a converging optical system, which is free from the problems discussed above and permits formation of a very small beam spot relatively easily.

According to an aspect of the present invention, there is provided a converging optical system for a laser bean source comprising a laser beam source for emitting a laser beam in a substantially Gauss intensity distribution and with a beam emission pattern with different beam emission angles in perpendicular directions, an optical system including an objective lens for receiving a laser beam in a portion of the beam emission intensity distribution in the neighborhood of optical axis in the aperture and converging the received laser beam to a very small spot, and a beam intensity filter with increasing permeability with increasing distance from the optical axis in a particular direction, the beam intensity filter being disposed in the scope of laser beam emitted from the laser beam source such that the particular direction is coincident with a small beam emission angle direction.

According to another aspect of the present invention, there is provided a converging optical system for a laser beam source comprising a laser beam source for emitting a laser beam in a substantially Gauss intensity distribution and with a beam emission pattern with different beam emission angles in perpendicular directions, an optical system including an objective lens for receiving a laser beam in a portion of the beam emission intensity distribution in the neighborhood of optical axis in the aperture and converging the received laser beam to a very small spot, and a beam intensity filter with increasing permeability with increasing distance from the optical axis in a particular direction, the beam intensity filter being disposed in the scope of laser beam emitted from the laser beam source such that the particular direction is coincident with a small beam emission angle direction and the output beam through the beam intensity filter of the laser beam source being such that the beam emission angle in the particular direction and the beam emission angle in the perpendicular direction are substantially equal.

The converging optical system satisfies a relation $$Y < -0.14 \times X + 0.68$$

where X represents the ratio between the beam emission angles in large and small beam emission angle directions in the emitted beam intensity distribution, and Y represents the ratio of the dose of laser beam transmitted through the beam intensity filter and received in the aperture of the objective lens to the dose of laser beam emitted from the laser beam source.

The beam intensity filter is constructed such that its permeability increases in a straight fashion, a curved fashion or a staircase fashion as one goes from the optical axis oppositely in the particular direction.

The beam intensity filter is constructed as a diffraction grating, non-diffracted laser beam component from the diffraction grating being utilized as beam intensity filter output.

The converging optical system further comprises a beam-separating optical system for separating a beam reflected from the point of convergence of laser beam converged by the objective lens from the laser beam emitted from the laser beam source and leading the separated beam to an optical detector, the beam-separating optical system being disposed between the objective lens and the beam intensity filter.

According to other aspect of the present invention, there is provided an optical system for converging a laser beam of a substantially Gauss intensity distribution and with a beam emission pattern with different beam emission angles in perpendicular directions emitted from a laser beam source through a beam intensity filter having a sectional transmitted beam intensity (permeability) distribution and an objective lens, wherein the beam intensity filter has the sectional transmitted beam intensity (permeability) distribution with increasing permeability with increasing distance from the optical axis in a particular direction, and is disposed in the scope of laser beam emitted from the laser beam source such that the particular direction is coincident with a small beam emission angle direction.

Other objects and features will be clarified from the following description with reference to attached drawings.

BRIEF DESCRIPTION OF THE DRAWINGS

FIG. 1 is a schematic view showing an embodiment of the present invention;

PREFERRED EMBODIMENTS OF THE INVENTION

Preferred embodiments of the present invention will now be described with reference to the drawings.

In the present invention, the beam intensity filter has such a permeability distribution that, the laser beam transmitted through it has a beam intensity distribution in a particular direction such that the beam intensity is reduced relatively greatly in the neighborhood of the optical axis compared to diametrically opposite ends of the beam. The beam intensity peak, and hence the beam intensity difference between the optical axis neighborhood and the diametrically opposite beam ends, is thus reduced, and the beam emission angle is enlarged in the distribution. On the other hand, in the distribution in the direction perpendicular to the particular direction, the beam intensity is reduced merely uniformly. It is thus possible to enlarge the apparent beam emission angle in the particular direction and obtain a beam intensity distribution close to beam emission angle distribution in the direction perpendicular to the particular direction. Thus, the beam intensity distributions in the two directions in the lens aperture of the objective lens can be made closer to each other, and it is thus possible to reduce the diametrical size of the converged beam spot. A very small converged beam spot thus can be obtained without need of changing the distance between or the disposition of the objective lens and the laser beam source by merely providing a beam intensity filter.

Japanese Patent Laid-Open No. 4-20920 discloses a technique of a scanning type optical system for exposure to a laser beam emitted from a laser beam source through a collimator lens and a polariscope. In this system, a density filter in which the permeability is low at the center and high at the edge, is disposed between the collimator lens and the poraliscope. This density filter is like the beam intensity filter according to the present invention insofar as its permeability characteristic is concerned. However, the disclosed technique has an aim of shaping the emitted laser beam to a beam having a beam intensity distribution suited for a beam modulation system. In this connection, the disclosed technique is obviously irrelevant to the technique according to the present invention, in which the beam emission angles in the perpendicular directions are made equal by disposing the beam intensity filter such that permeability characteristic thereof in one of the two directions corresponds to the beam emission angle.

Figure 2A:
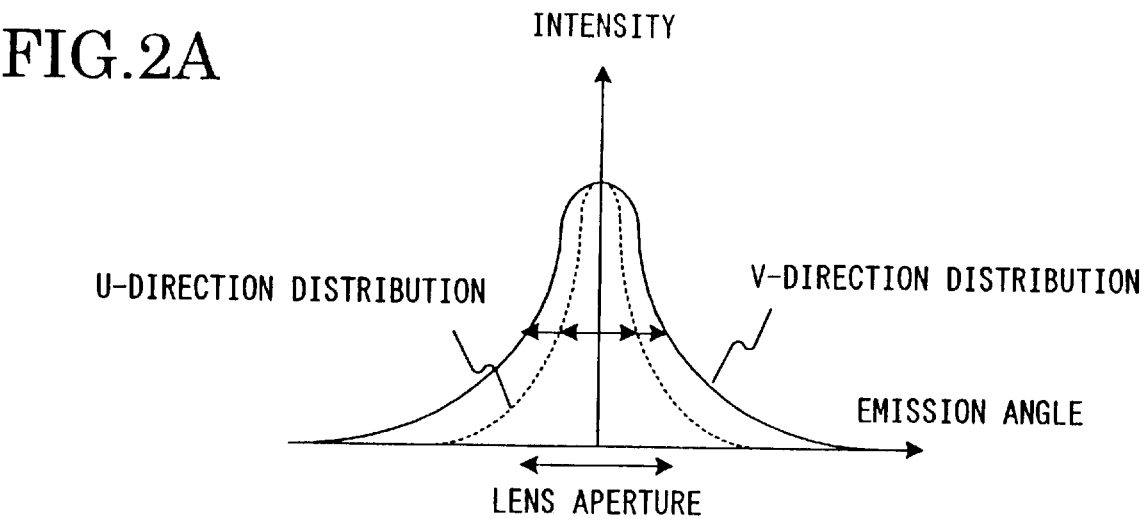
FIGS. 2A and 2B show relationships between the beam intensity and the beam emission angle.
Figure 3A:
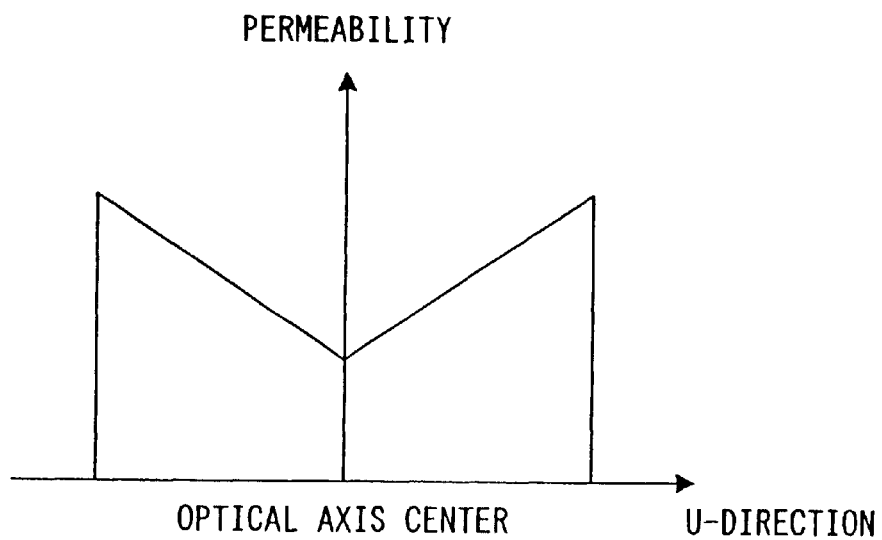
FIGS. 3A and 3B show an example of the permeability distribution of the beam intensity filter 2 according to the invention.
Figure 3B:
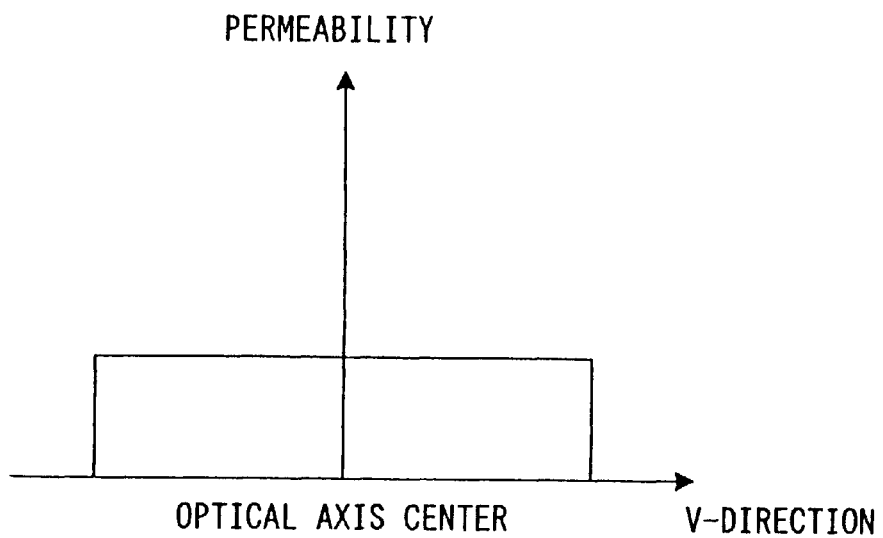

An embodiment of the present invention will now be described with reference to the drawings. FIG. 1 is a schematic view showing an embodiment of the present invention. A laser beam emitted from a laser beam source 1 is transmitted through a beam intensity filter 2 having a sectional transmitted beam intensity distribution and then converged through an objective lens 3 as a very small beam spot. Denoting the vertical direction in FIG. 1 to be V axis direction and the horizontal direction to be U axis direction, the laser beam emitted from the laser beam source 1 has a beam intensity distribution as shown in FIG. 2A. The beam intensity filter 2 is constructed such that its permeability is uniform in the V axis direction while being low at the center and high at the diametrically opposite ends in the U axis direction. FIGS. 3A and 3B show an example of the permeability distribution of the beam intensity filter 2. Specifically, FIGS. 3A and 3B show the permeability characteristics of the beam intensity filter 2 in the directions of the U and V axes passing through the optical axis of the filter. As shown, the permeability is uniform in the V axis direction, but in the U axis direction it is lowest in the neighborhood of the optical axis and increases as one goes away therefrom.

Figure 2B:
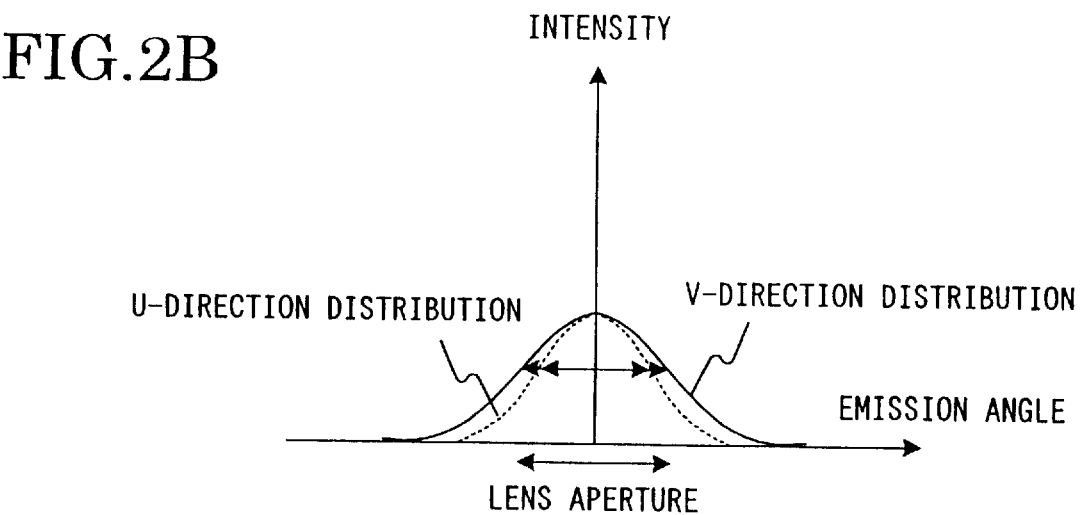

With this distribution of the beam intensity filter 2, the laser beam transmitted therethrough has a beam intensity distribution as shown in FIG. 2B. In the beam intensity distribution in the U axis direction, the beam intensity is reduced relatively greatly in the neighborhood of the optical axis compared to the diametrically opposite ends of the beam. The beam intensity peak, and hence the beam intensity difference between the optical axis neighborhood and the diametrically opposite beam ends, is thus reduced, and the beam emission angle is enlarged in the distribution. On the other hand, in the distribution in the V axis direction the beam intensity is reduced merely uniformly. In this way, with the beam intensity filter 2 it is possible to enlarge the apparent beam emission angle in the U axis direction and obtain a beam intensity distribution close to beam emission angle distribution in the V axis direction. Thus, the beam intensity distributions in the V and U axis directions in the lens aperture of the objective lens 3 can be made closer to each other, and it is thus possible to reduce the diametrical size of the converged beam spot. A very small converged beam spot thus can be obtained without need of changing the distance between or the disposition of the objective lens 3 and the laser beam source 1 but by merely disposing the beam intensity filter 2.

Figure 4A:
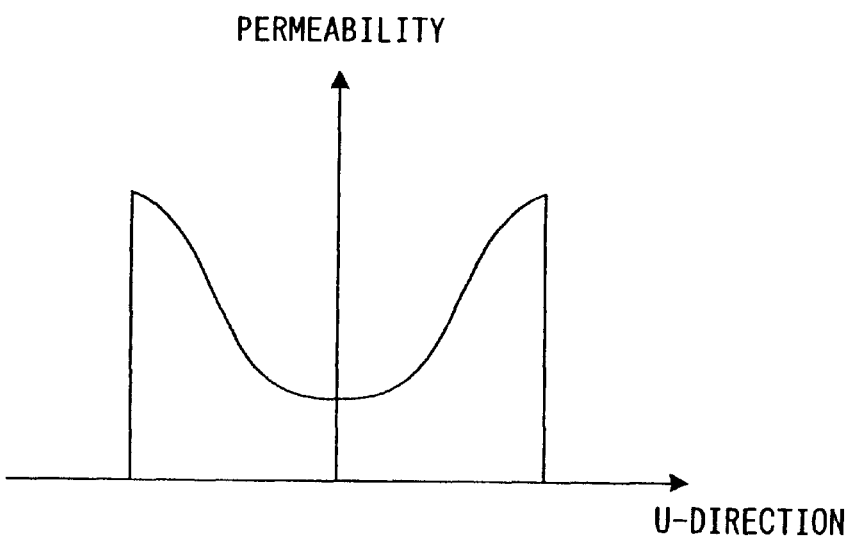
FIGS. 4A and 4B show another example of the permeability distribution of the beam intensity filter 2 according to the invention.
Figure 4B:
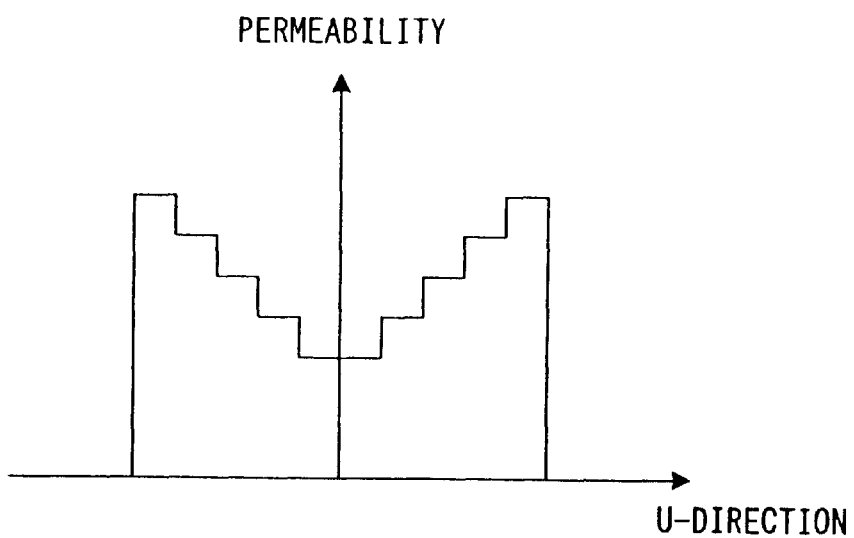

In the above embodiment the beam intensity filter 2 has such a U axis direction permeability characteristic that the permeability increases in a straight fashion from the optical axis neighborhood toward the diametrically opposite ends. However, the filter 2 may also have such a characteristic that the permeability increases in a curved fashion as shown in FIG. 4A or in a staircase fashion as shown in FIG. 4B.

Figure 5A:
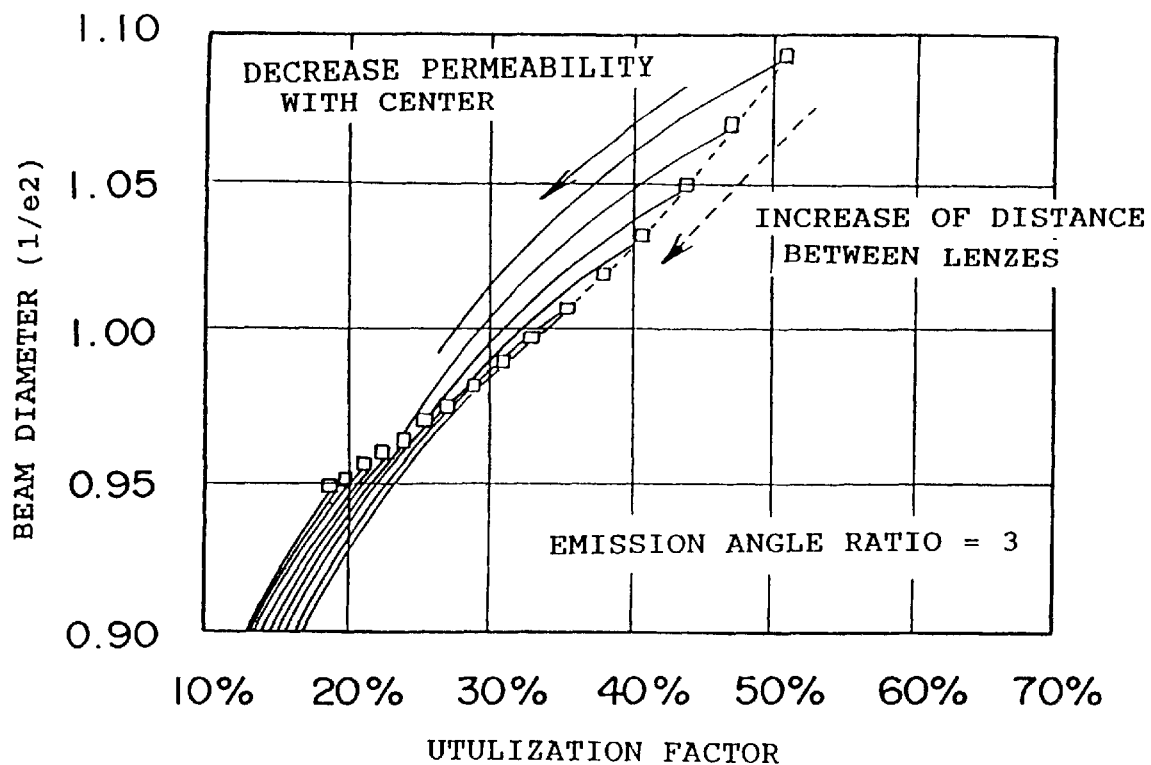
FIGS. 5A to 5C show relationships between the beam utilization factor and the beam diameter.
Figure 5B:
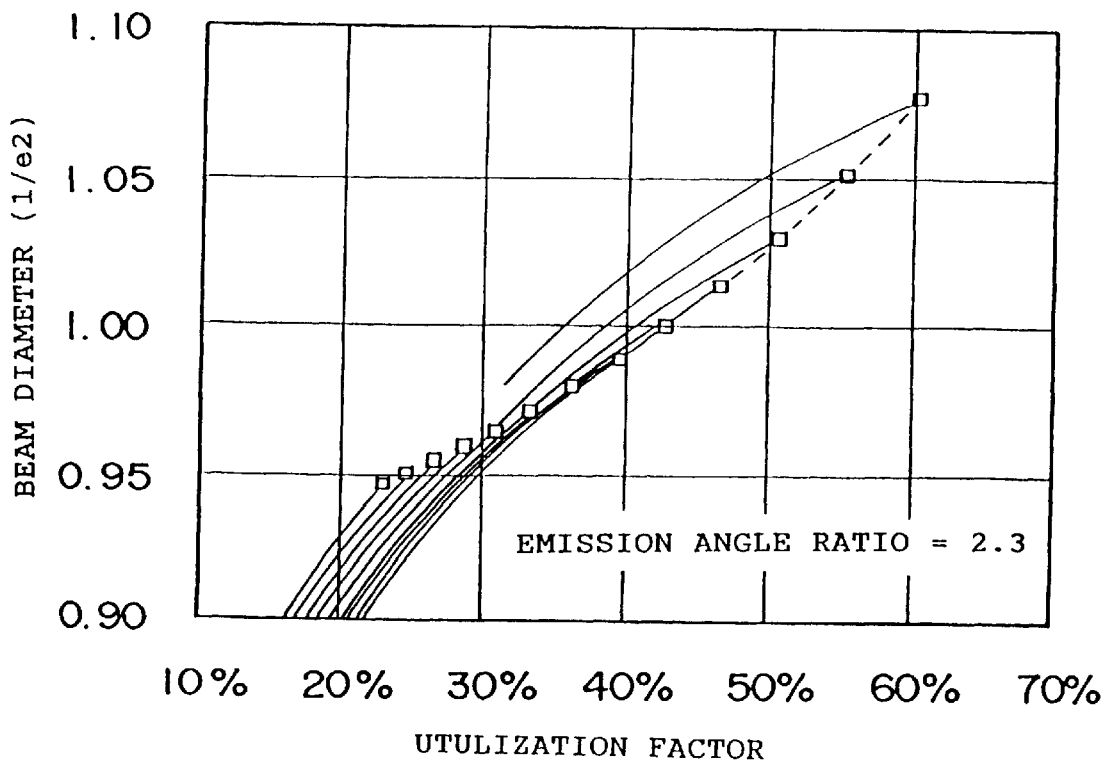
Figure 5C:
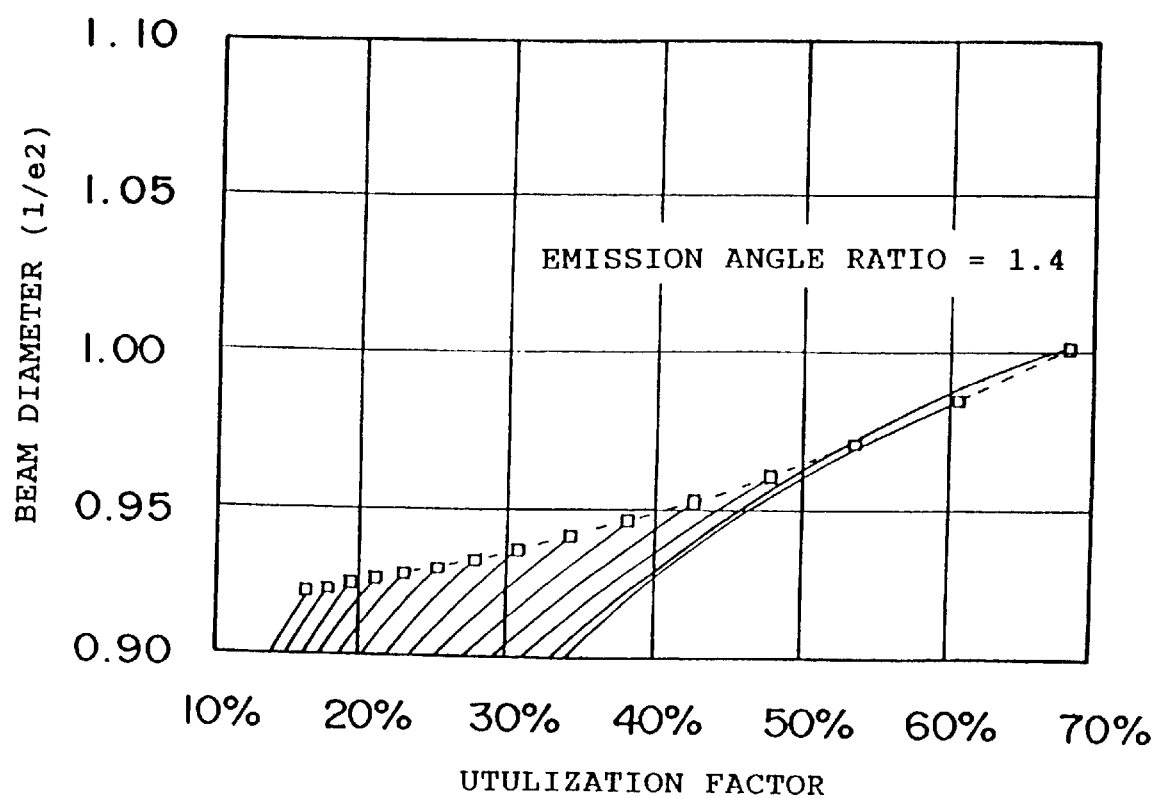

In the meantime, the use of the above beam intensity filter 2 naturally leads to beam utilization factor reduction. FIGS. 5A to 5C are graphs showing results of comparison of the beam utilization factor with the construction, in which the distance between the objective lens 3 and the laser beam source 1 is increased as described before in connection with the prior art technique. In the graphs, the ordinate is taken for the U axis direction dimension of the converged beam spot in a given scale, and the abscissa is taken for the beam utilization factor, which is the ratio of the total dose of laser beam emitted from the laser beam source 1 to the dose of laser beam reaching the lens aperture of the objective lens 3. The beam intensity filter 2 has permeability distributions as shown in FIGS. 3A and 3B. In the U axis direction, the permeability is set to 100% at the diametrically opposite ends of the lens aperture, and is varied between 100 and 30% at the optical axis as center position.

In the graphs, the numbers of solid line plots correspond to reducing permeability as one goes to the left from the 100% center position permeability point as starting point and to increasing distance between the laser beam source 1 and the objective lens 3 as one goes left down ward from the starting point. Thus, the broken lines connecting the starting points in the graphs represent the relation between the beam diameter and the utilization factor in the case, where merely the distance between the laser beam source and the objective lens is increased without provision of the beam intensity filter 2. FIGS. 5A to 5C correspond to cases, in which the beam emission angle relation between the U and V axis directions is 3, 2.3 and 1.4, respectively. The beam emission angle ratio between the U and V axis directions corresponds to the values shown by arrow marks in FIG. 2B. It will be seen from the graphs that the solid line plots tend to be found above the broken lines with high beam utilization factors and below the broken line with low beam utilization factors. As is seen, with solid line plots below the broken lines, it is advantageous to use type beam intensity filter 2 rather than increasing the distance between the laser beam source 1 and the objective lens 3 because doing so permits reducing the beam diameter with the same beam utilization factor.

Figure 6:
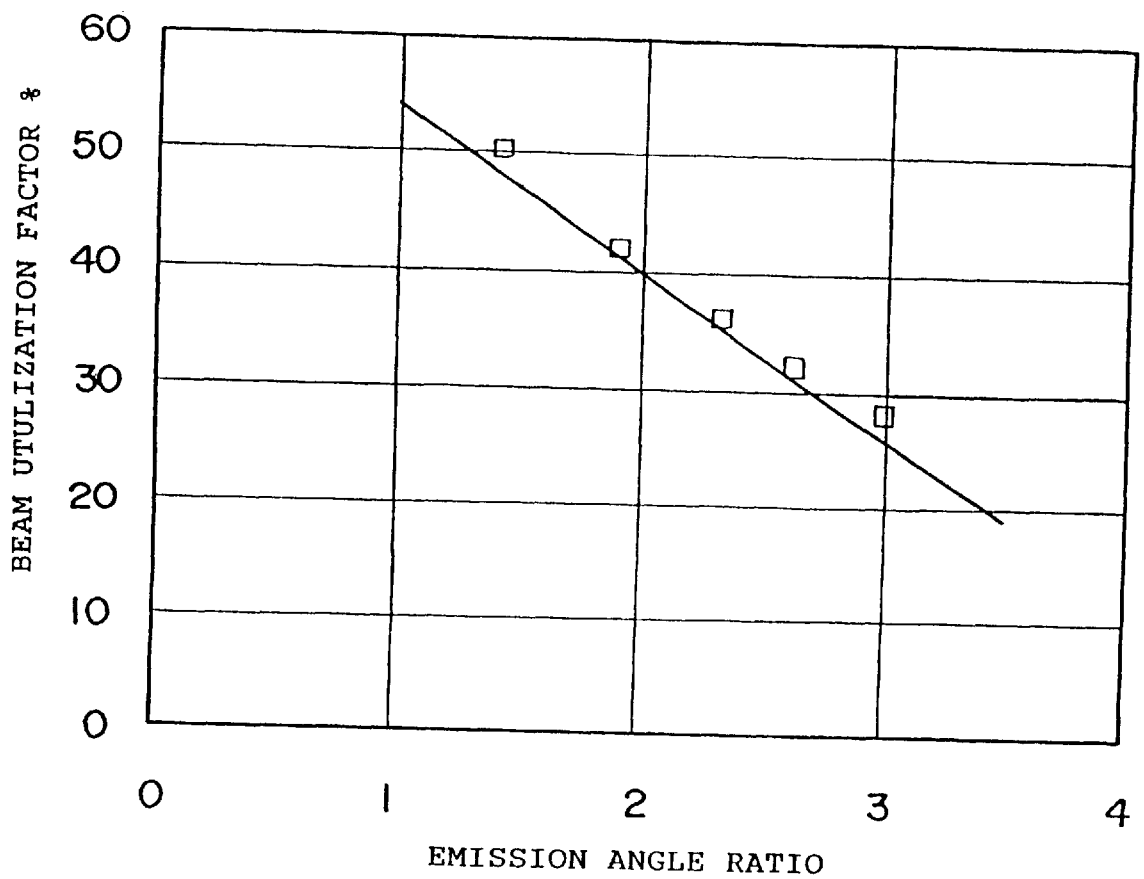
FIG. 6 shows a relationship between the beam emission angle ratio and the beam utilization factor.

Furthermore, as is seen from FIGS. 5A to 5C, the beam utilization factor, which the beam intensity filter 2 can be advantageously used with, varies with the beam emission angle. FIG. 6 shows a solid line plot of advantageous beam utilization factor points marked by squares, which are obtained by obtaining several different beam emission angle ratios. The solid line plot is obtained from these data in experimental rules, and denoting the beam emission angle by X and the beam utilization factor by Y (Y being not any percent but a decimal fraction), we have $$Y = -0.14 \times X + 0.68 \tag{1}$$

Investigations were also conducted with beam intensity filters with permeability characteristics other than straight line ones, such as curved line and staircase ones as shown in FIGS. 4A and 4B, and substantially the same results as in FIG. 6 could be obtained. It was thus made obvious that the use of the beam intensity filter 2 in a beam utilization factor range of $$Y < -0.14 \times X + 0.68 \tag{2}$$

is more advantageous form the beam utilization factor standpoint as well than the system, in which the distance between the laser beam source 1 and the objective lens 3 is increased.

Figure 7A:
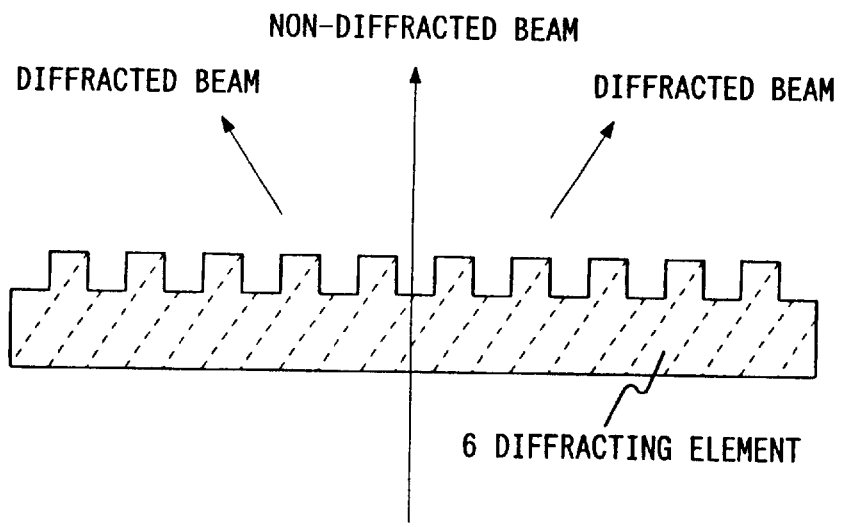
FIGS. 7A and 7B show a diffracting element as the beam intensity filter and its emission angle characteristic.
Figure 7B:
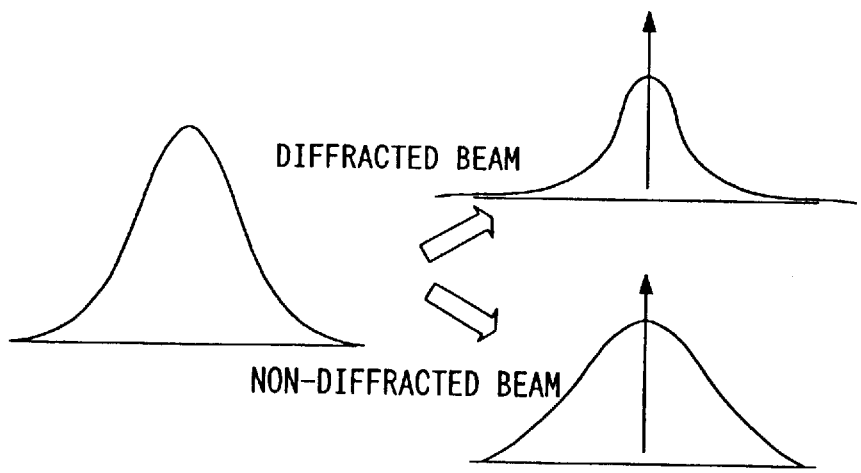

As the beam intensity filter 2 may be used one, which can not only enlarge the beam emission angle by utilizing the permeability to the beam as in the above embodiment but also absorb or reflect part of the incident laser beam. According to the present invention, it is also possible to use a beam diffracting element 6 such as a diffraction grating or a hologram, as shown in FIG. 7A. In such case, a non-diffracted component, i.e., 0-th order beam component, or a diffracted beam component may be utilized as filter output beam. As shown in FIG. 7B, the non-diffracted beam component sorted out from the diffracted beam component, is such that its beam intensity is reduced in the neighborhood of the center so that its beam intensity distribution is spread, whereas the diffracted beam component has its beam intensity gathered in the neighborhood of the center so that the distribution spread is reduced. It will thus be seen that the non-diffracted beam component may be used when forming the very small beam spot as described before. The beam intensity distribution may be realized by changing the opposition, onto which the beam from the beam diffracting element is projected, and thus changing the beam diffraction factor. Such a diffraction grating is advantageous for mass production compared to the density filter because a plurality of its replicas can be readily formed.

Figure 8:
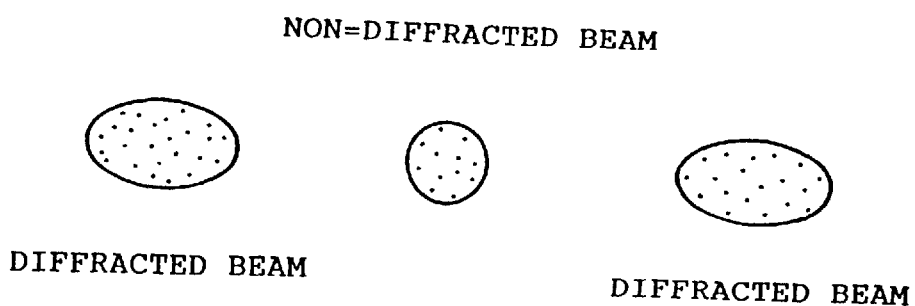
FIG. 8 shows beam spots of the diffracted light and non-diffracted light.

By converging the diffracted beam component at the same time with the objective lens, as shown in FIG. 8, the non-diffracted beam component forms a nearly circular beam spot, while the diffracted beam component forms a more oval beam spot because of increased beam intensity distribution difference. Thus, where a converging optical system utilizing a diffracting element is used in an optical system of an optical head for optical disc, with such an arrangement that a plurality of beam spots like those noted above are arranged in a row extending in a track direction, i.e., the recording direction of the optical disc, the smaller dimension direction of the diffracted beam spot is directed perpendicularly to the track direction. In this way, the system can be utilized for detecting deviation from the track position.

Figure 9:
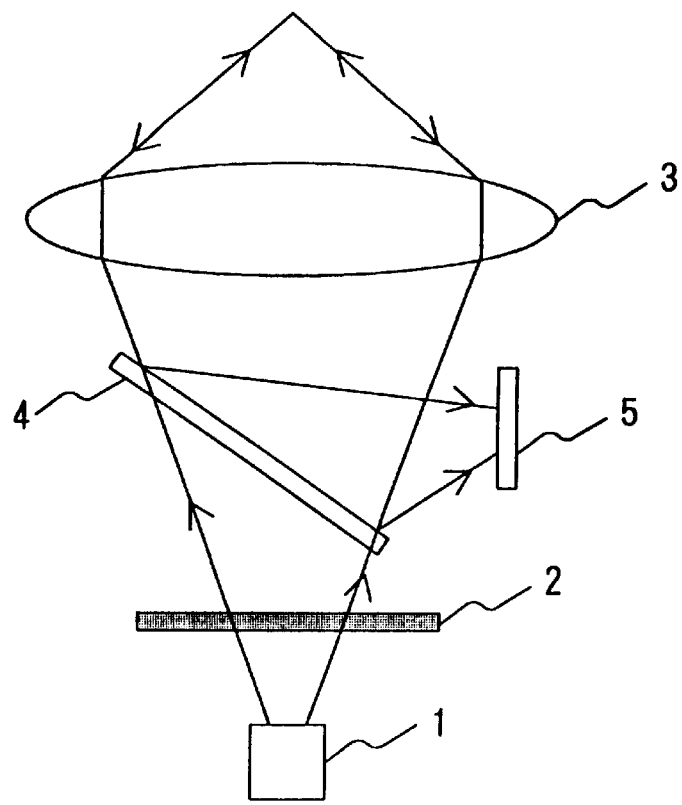
FIG. 9 shows an example of the optical system applied to the optical head.
Figure 10:
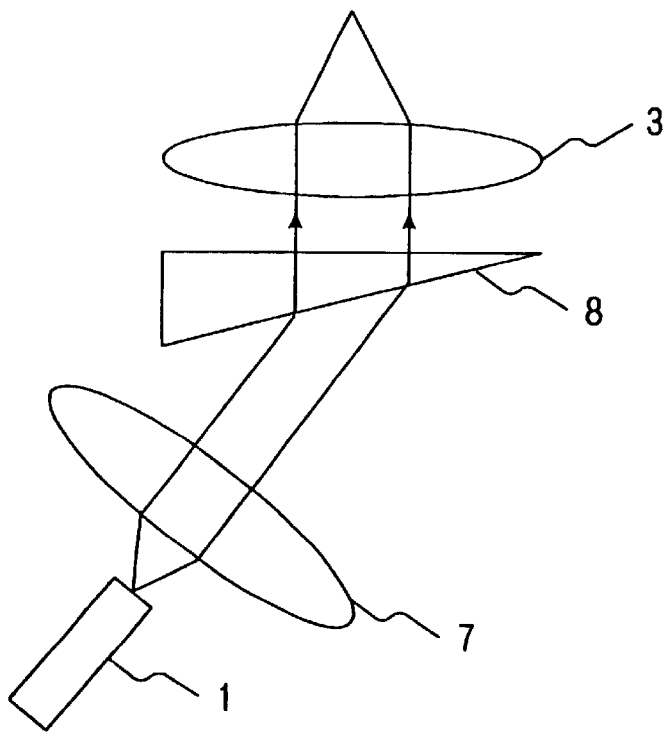
FIG. 10 shows a different prior art technique, in which the beam intensity distribution of a laser beam is enlarged in a particular direction

In the application of the present invention to the above optical head, in the case of separating a return beam reflected by the optical disc at the point of convergence and detecting the separated return beam with a beam detector, it is possible to prevent loss of the dose of the return beam by disposing a beam intensity filter ahead of the beam separating optical system. FIG. 9 shows an example of such optical system. In this case, a laser beam emitted from a laser beam source 1 is transmitted through a beam intensity filter and then converged through an objective lens 3 to a very small beam spot. A return beam reflected from the point of convergence is separated in a beam splitter 4 from the forward beam and led to a beam detector 5. Since the return beam is not transmitted through the beam intensity filter 2, no beam dose loss due to the beam intensity filter 2 takes place in the beam detection in the beam detector 5.

While in the above embodiment the laser beam is converged by the sole objective lens, the same effects are also obtainable in the case, in which a collimator lens (not shown) is used to collimate the emitted laser beam to a parallel beam before converging the beam with the objective lens, or the case, in which a beam intensity filter is disposed between the laser beam source and the collimator lens or between the collimator lens and the objective lens. Also, while in the above embodiment the objective lens had a circular lens aperture, the same beam diameter reduction effect is obtainable with an elliptical, an oval or a square lens aperture as well.

As has been described in the foregoing, according to the present invention a beam intensity filter in which the permeability increases gradually as one goes away from the optical axis in a particular direction, is disposed in the scope of laser beam emitted from a laser beam source such that the particular direction coincides with a small beam emission angle direction. In the laser beam transmitted through the beam intensity filter, the beam intensity difference between the optical axis neighborhood and the diametrically opposite beam ends is thus reduced, and the beam emission angle is enlarged in the distribution. The beam emission angles from the particular direction thus may be made to provide a beam intensity distribution close to that of the beam emission angles from the perpendicular direction. It is thus possible to make the intensity distributions in the two directions in the lens aperture of the objective lens closer to each other. A very small converged beam spot thus can be obtained without need of changing the distance between the disposition of the objective lens and the laser beam source but by correcting the asymmetricity of the beam emission angles of the semiconductor laser.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A converging optical system for a laser beam source comprising a laser beam source for emitting a laser beam in a substantially Gauss intensity distribution and with a beam emission pattern with different beam emission angles in perpendicular directions, an optical system including an objective lens for receiving a laser beam in a portion of the beam emission intensity distribution in the neighborhood of optical axis in the aperture of the objective lens and converging the received laser beam to a very small spot, and a beam intensity filter with increasing permeability with increasing distance from the optical axis in a particular direction, the beam intensity filter being disposed in the scope of laser beam emitted from the laser beam source such that the particular direction is coincident with a small beam emission angle direction.

2. A converging optical system for a laser beam source comprising a laser beam source for emitting a laser beam in a substantially Gauss intensity distribution and with a beam emission pattern with different beam emission angles in perpendicular directions, an optical system including an objective lens for receiving a laser beam in a portion of the beam emission intensity distribution in the neighborhood of optical axis in the aperture of the objective lens and converging the received laser beam to a very small spot, and a beam intensity filter with increasing permeability with increasing distance from the optical axis in a particular direction, the beam intensity filter being disposed in the scope of laser beam emitted from the laser beam source such that the particular direction is coincident with a small beam emission angle direction and the output beam through the beam intensity filter of the laser beam source being such that the beam emission angle in the particular direction and the beam emission angle in the perpendicular direction are substantially equal.

3. The converging optical system for a laser beam source according to claim 2, which satisfies a relation $Y < -0.14 \times X + 0.68$ where X represents the ratio between the beam emission angles in large and small beam emission angle directions in the emitted beam intensity distribution, and Y represents the ratio of the dose of laser beam transmitted through the beam intensity filter and received in the aperture of the objective lens to the dose of laser beam emitted from the laser beam source.

4. The converging optical system for a laser beam source according to claim 1, wherein the beam intensity filter is constructed such that its permeability increases in a straight fashion, a curved fashion or a staircase fashion as one goes from the optical axis oppositely in the particular direction.

5. The converging optical system for a laser beam source according to claim 1, wherein the beam intensity filter is constructed as a diffraction grating, non-diffracted laser beam component from the diffraction grating being utilized as beam intensity filter output.

6. The converging optical system for a laser beam source according to claim 1, which further comprises a beam-separating optical system for separating a beam reflected from the point of convergence of laser beam converged by the objective lens from the laser beam emitted from the laser beam source and leading the separated beam to an optical detector, the beam-separating optical system being disposed between the objective lens and the beam intensity filter.

7. An optical system for converging a laser beam of a substantially Gauss intensity distribution and with a beam emission pattern with different beam emission angles in perpendicular directions emitted from a laser beam source through a beam intensity filter having a sectional transmitted beam intensity (permeability) distribution and an objective lens, wherein the beam intensity filter has the sectional transmitted beam intensity (permeability) distribution with increasing permeability with increasing distance from the optical axis in a particular direction, and is disposed in the scope of laser beam emitted from the laser beam source such that the particular direction is coincident with a small beam emission angle direction.

8. The converging optical system for a laser beam source according to claim 2, wherein the beam intensity filter is constructed such that its permeability increases in a straight fashion, a curved fashion or a staircase fashion as one goes from the optical axis oppositely in the particular direction.

9. The converging optical system for a laser beam source according to claim 2, wherein the beam intensity filter comprises a diffraction grating, a non-diffracted laser beam component from the diffraction grating being utilized as a beam intensity filter output.

10. The converging optical system for a laser beam source according to claim 2, which further comprises a beam-separating optical system for separating a beam reflected from the point of convergence of a laser beam converged by the objective lens from the laser beam emitted from the laser beam source and leading the separated beam to an optical detector, the beam-separating optical system being disposed between the objective lens and the beam intensity filter.

* * * * *